United States Patent

[11] 3,603,950

| [72] | Inventor | Thomas W. Hartford<br>Livonia, Mich. |
|---|---|---|
| [21] | Appl. No. | 826,557 |
| [22] | Filed | May 21, 1969 |
| [45] | Patented | Sept. 7, 1971 |
| [73] | Assignee | The Bendix Corporation |

[54] REDUNDANT SPROCKET LOGIC SYSTEM FOR MACHINE TOOL NUMERICAL CONTROL
17 Claims, 4 Drawing Figs.

[52] U.S. Cl. .................................................. 340/222,
235/61.11, 250/219
[51] Int. Cl. ........................................................G05b 23/00,
G06k 7/00
[50] Field of Search............................................. 235/61.11
E; 250/219 ID; 340/222

[56] References Cited
UNITED STATES PATENTS
| 3,067,934 | 12/1962 | Amacher et al. ............. | 235/61.11 |
| 3,222,501 | 12/1965 | Wood........................... | 250/219 X |
| 3,461,305 | 8/1969 | Moulton....................... | 250/219 |
| 3,465,130 | 9/1969 | Beltz et al. ................... | 235/61.11 |
| 3,496,342 | 2/1970 | Milford ........................ | 235/61.11 |

*Primary Examiner*—John W. Caldwell
*Assistant Examiner*—Perry Palan
*Attorneys*—William F. Thornton and Plante, Hartz, Smith & Thompson

ABSTRACT: A redundant sprocket logic and malfunction detection system for a machine tool numerical control comprising logic circuits generating a redundant sprocket signal from the instruction bits recorded on each row of coded instruction on a tape. The redundant sprocket signal permits the machine tool control to operate in a normal manner in the absence of reading of the physical sprocket signal corresponding to each row of instruction bits, while providing an alarm signal indicative of malfunction of the system. In the event of absence of both the redundant sprocket signal and the physical signal, an appropriate control signal is generated which shuts down the machine control system.

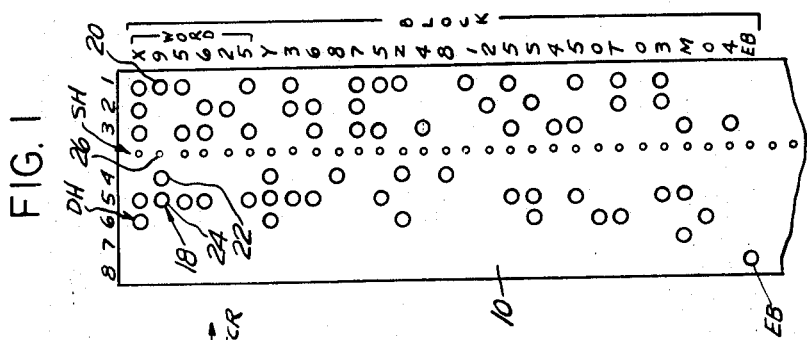
FIG. 1
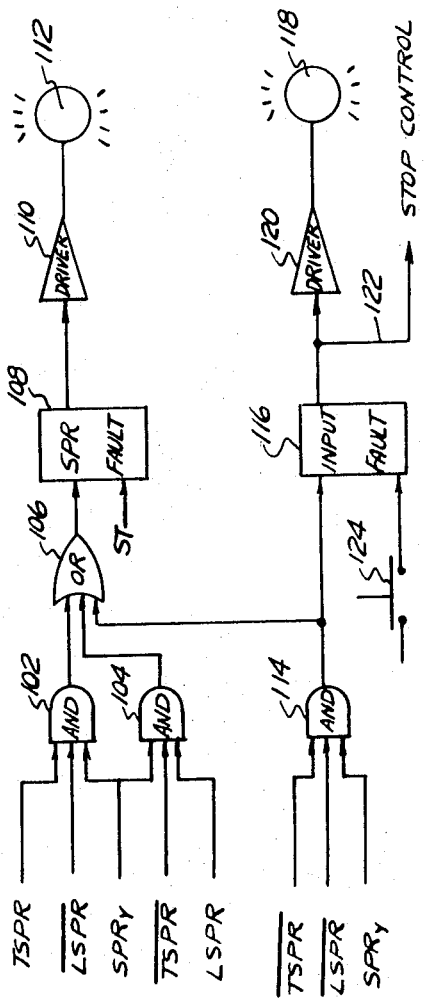
FIG. 2
FIG. 3
INVENTOR
THOMAS W. HARTFORD
By William F. Thourtro

REDUNDANT SPROCKET LOGIC SYSTEM FOR MACHINE TOOL NUMERICAL CONTROL

BACKGROUND OF THE INVENTION

The present invention relates to machine tool numerical control systems in general, and more particularly to a system providing a redundant sprocket signal permitting a machine tool numerical control system to operate in the usual manner in spite of the failure of the tape reader, forming part of the control system input, to read a physical sprocket providing appropriate timing of the control system diverse functions.

Electronic control systems capable of receiving numerical data in the form of coded instructions and of acting to control the position of an output element in accordance with such data are well known. In a well-known type of system, or point-to-point position control, instruction data, stored on a punched card, or on a flexible tape or the like in the form of punched holes or magnetic indicia according to an appropriate code, is read by an appropriate reader, stored in registers, and utilized to generate command signals causing a relative displacement between a tool and a workpiece to appropriate coordinate locations of the tool relatively to the workpiece on two, three or more axes, appropriate tool selection and feed rate, or such as to automatically effectuate predetermined machining operations on the workpiece. In point-to-point position control systems, the tool is generally maintained out of engagement with the workpiece during the relative displacement of the tool and workpiece, although these systems permit to control straight cut milling parallel to one of the axes.

In another well-known numerical control system for machine tools, or continuous path system, the operating parts of the machine tool are continuously controlled in such manner that the cutting tool and the workpiece are generally continuously engaged during their relative displacement along a continuous path in order to produce a finished workpiece of predetermined shape and dimensions, such shape and dimensions being determined by the numerical instruction data provided to the input of the system in the form of punched tape or magnetic tape presenting blocks of information in the form of rows of punched holes or discrete magnetized areas on the tape. The information recorded on the tape is in the form of coded instructions which are read by an appropriate reader and which are supplied to a controller for generating electrical pulse trains in accordance with the instruction contained on the tape, the pulses being introduced into a servo mechanism for producing discrete movement of the mechanical output device, such as for example, a machine tool lead screw, for each pulse which is received.

The instruction tape generally carries several consecutive groups of instructions or words, each of which is adapted to act through a separate servo mechanism to control the relative mechanical motion along a different axis of the cutting tool relatively to the workpiece. The resultant movement of the cutting tool relatively to the workpiece is the algebraic or vector sum of the component movements generated by the various servo mechanisms in different axes. The instructions from the tape are also in the form of regularly spaced rows of aligned punched holes or bits, or in the form of rows of invisible magnetized bits on a magnetic tape. The information data is recorded according to a predetermined code whereby the location and the presence or absence of a bit in a predetermined location in consecutive rows forming each word represent a particular instruction in the chosen code. Each row of instruction bits is provided with a sprocket in the form of a hole in punched tape or in the form of a particular synchronization bit on a magnetic tape. The tape is continuously translated relative to the tape reader which, in addition to reading the instruction bits, is adapted to read each sprocket bit for appropriate timing of the sequential operations of the machine tool control system.

The arrangement of the instructions on the tape is according to a predetermined organization such that, for example, each group of instructions, or block, consists of a plurality of words each preceded by an address indicating a particular function of the machine, such as displacement along the X-, the Y- or the Z-axis, followed by numerical instructions defining the length of the vectorial displacement and auxiliary functions such as feed rate, turning coolant on or off, etc. Each word in a block is read by the tape reader while the tape is being translated relatively to the reader, until the end of block code is read by the reader, thus stopping the translation of the tape until all the instructions contained in the block have been processed by the controller.

In systems utilizing punched tape as instruction input, the instruction data on the tape is read by way of a tape reader having a photocell or photodiode for each longitudinal channel of recorded information on the tape, all of the photocells or photodiodes being disposed in a single transverse row at right angle to the axis of translation of the tape. A light source is disposed in the tape reader on one side of the tape, the read heads being disposed on the other side. One head is adapted to read the sprocket holes, which are of a much smaller diameter than the information data holes. The machine tool is generally operated under conditions far from ideal conditions and which are the conditions generally present in a shop or plant. Dirt may be present on the tape or in the environment of the tape reader with the result that dirt continuously builds up on the tape reader and the dirt buildup may clog the sprocket holes in the tape, the light aperture holes in the tape reader on the channel heads, so as to cause faulty readings or complete failure. Because the sprocket holes are much smaller than the data holes, the sprocket hole reader is generally the first one to fail.

Because the sprocket hole commands the reading of the data if, for some reason, a sprocket hole is not read, there results a wrong command to the machine because of the failure of the control system to recognize a particular set of instruction data. The result may be a wrong positioning of the tool relatively to the workpiece, for example, which may cause scrapping of a valuable part or, in some instances, it may be a complete runaway of the machine, which may cause considerable damage to the workpiece, or to the machine, or both, before the machine operator has a chance to react and stop the machine.

In systems utilizing magnetic tape as instruction data input, the instruction data, in the form of successive rows of magnetized bits in parallel longitudinal channels, is read by way of electromagnetic transducers or heads each corresponding to a channel and all the heads, often in the form of a multichannel head having individual gap, core coil and output for each channel, being disposed in a row transversely to the translation of the tape. One head is adapted to read each sprocket or synchronization bit corresponding to each row of information bits. In the event that the sprocket is not read, due to the absence of the sprocket from the tape, or failure of the sprocket read head, or any other reason, malfunctioning of the control system results in identical erroneous finished workpiece or runaway of the machine as would be the case with systems utilizing punched tape.

The present invention provides means for avoiding such catastrophic failures in numerically controlled machine tools, and has particular application in systems utilizing punched tape or magnetic tape as an input, as it will be obvious to those skilled in the art that the principles of the invention may be used in systems utilizing magnetic tape, although the specific example of an embodiment hereinafter described in detail relates to typical applications in a numerically controlled machine tool utilizing punched tape as its control input.

The present invention contemplates generating a redundant sprocket signal from each row of data information on the tape, irrespective of the presence or not of a physical sprocket. The invention contemplates utilizing the redundant sprocket signal for controlling the operation of the machine controller in the usual manner, while providing an alarm signal indicating malfunction of the physical sprocket reading or redundant sprocket signal generating systems. In the event of malfunction of both the physical sprocket reading system and the redundant sprocket system, the invention provides means automatically stopping the machine control system before further damage is caused to the workpiece or machine tool, the only resulting damage being generally in the form of a dwell mark on the workpiece at a location where the tool operation was interrupted. In addition, the present invention also provides for means permitting normal operation of a machine tool numerical control system in spite of actual or apparent skew being present in the instruction data tape, by providing appropriate delay for the operation of the controller to insure that the information data is properly stored in registers before generating adequate command signals to the machine tool servo mechanism.

SUMMARY OF THE INVENTION

The present invention has therefore for a principal object to provide a redundant sprocket signal and malfunction indicating alarm system for numerically controlled machine tools and the like. The many other objects and advantages of the present invention will become apparent to those skilled in the art when the following description of an example of embodiment for practicing the invention is read in conjunction with the accompanying drawings wherein:

BRIEF DESCRIPTION OF THE DRAWINGS

FIG. 1 illustrates an example of a portion of a typical instruction punched tape for use as an input to a numerically controlled machine tool;

FIG. 2 is a simplified partial logic diagram of an example of the present invention;

FIG. 3 is a simplified logic diagram of the alarm producing portion of the present invention.

DETAILED DESCRIPTION OF THE PREFERRED EMBODIMENT

Figure 4:
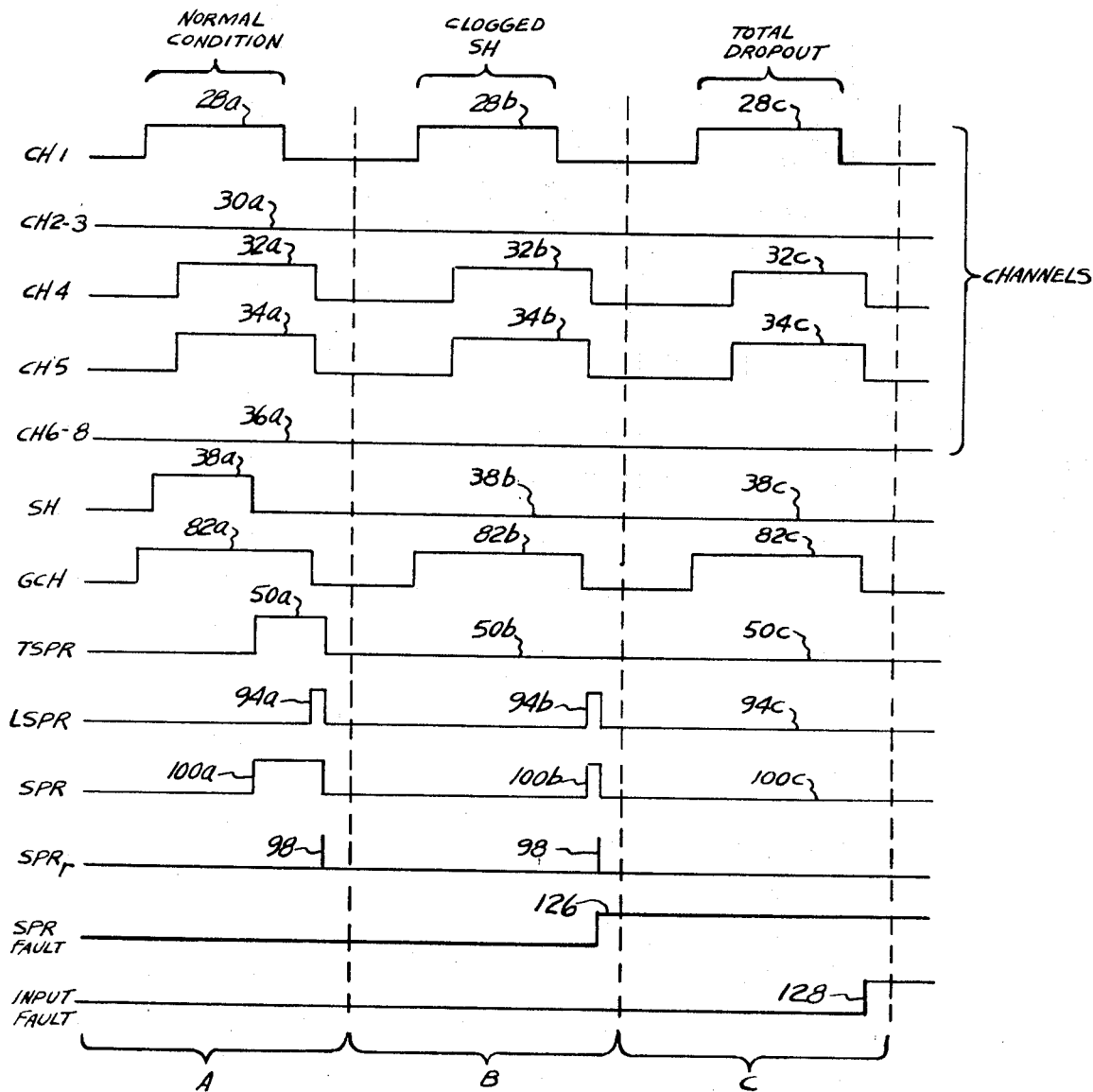
FIG. 4 is a graph representing a plurality of waveforms useful in understanding the principle of the invention.

The present invention will be herein described relatively to a numerical control for a machine tool utilizing instruction data in an appropriate code in the form of punched holes in a continuous piece of elongated tape as shown at 10 in FIG. 1. In the arrangement illustrated, the example of tape shown at 10 is arbitrarily provided with eight longitudinal rows or channels of data holes DH or data bits, the channels being numbered 1 through 8 at the top of the drawing. A longitudinal row of sprocket holes, or bits, designated as SH, is disposed between channel 3 and channel 4. It can be seen that the sprocket holes have a diameter substantially smaller than that of the data holes DH, and that each sprocket hole is aligned in a transverse row which further includes one or more data holes, the number and the position of the data holes being according to a predetermined code. In the example illustrated at FIG. 1, there is shown a portion of a tape forming a complete block of instructions, the instructions consisting of a plurality of "words" each one forming a set of instructions to the machine controller. The first three words, each one preceded by the appropriate X-, Y- and Z-axis address code, instruct the controller of the machine tool to displace the cutting tool thereof relatively to the workpiece, simultaneously along the three axes, of component displacement vectors the resultant of which determines the final position of the cutting tool relatively to the workpiece, in a manner well known in continuous path numerical control. The sign, i.e. the direction, of the displacement along each axis, not being indicated on the tape, is assumed to be positive. The tape 10 is translated through a tape reader, as shown at 12 in FIG. 1, in a continuous manner from the beginning of a block of information or instruction until the individual reader in channel eight reads the end of block, EB, hole, at which point the tape is stopped and held motionless until all the instructions contained in the block have been processed by the controller, at which time the next block of instructions is read.

As shown in FIG. 2, each individual channel reader reads each "bit" in an appropriate channel of the consecutive rows or data holes, each individual reader consisting of a photocell or photodiode, not shown, providing an output each time a light, not shown, is allowed to shine through a punched hole. The output signals from the individual readers through channel lines labeled CH1 through CH2 in FIG. 2 are individually amplified by an appropriate amplifier before storage in a channel register. Only one such amplifier 14 and the corresponding channel 1 register 16 are illustrated in FIG. 2, although it is to be understood that each channel is also individually provided with an amplifier and a register. The information stored in each of the channel registers, such as 16, is thereafter utilized as command signals for operating the control system of the numerically controlled machine tool in a manner well known in the art and forming no part of the present invention.

The present invention will be hereinafter described relatively to the operation of the arrangement of FIGS. 2 and 3 resulting from the reading of an example character, or one row of information data, such as the information data contained in the second row or character of FIG. 1, identified at 18, the reading of the example character row 18 being further assumed to be effected with skew present in the tape so as to further explain an added advantage of the present invention. The example character 18, or digit 9 expressed in the binary coded decimal system, BCD, represents the most significant digit 9 of the X-axis command word. It is a represented by a hole 20 punched in channel 1, a hole 22 punched in channel 4 (parity channel) and a hole 24 punched in channel 5, the other channels being devoid of holes. It is arbitrarily assumed that the holes in channel 4 and 5 are not read by the tape reader simultaneously with the reading of the hole 20 in channel 1, because of tape skew. Such tape skew may be caused by anyone of a plurality of reasons such as, for example, incorrect alignment of the tape punches during the tape encoding operation, defective or worn punches leaving a portion of the chaff in the punched holes, dirt accumulation in the reader or incorrect alignment of the reader photocells or photodiodes. Under such conditions of tape skew, the punched holes 22 and 24 in channels 4 and 5 are read by the tape reader a short period of time after reading of the hole 20 in channel 1. In addition the row, or character 18, is also provided with a sprocket hole 26 which is read by an appropriate sprocket hole reader generating an output signal providing adequate timing for the machine tool control function in the usual manner.

Referring now to FIG. 4 which depicts idealized waveforms relative to the example of character arbitrarily chosen, the portion A of FIG. 4 illustrates a normal condition with tape skew however, portion B illustrates a condition whereby the sprocket hole or the sprocket hole reader is clogged, or other malfunction of the sprocket hole SH channel, such that there is no output from the sprocket hole reader, and the portion C illustrates a condition of total dropout of the system.

As shown in the portion A of FIG. 4, under normal conditions, for a reading of the character 18 on the tape 10 of FIG. 1, there will be a reading for the hole or bit 20 in channel 1, thus resulting in a pulse 28a at the output of the reader of channel 1, CH1. There is no output from the channel 2 and 3 readers, as shown by continuous line 30a, for the waveform labeled CH2–3 while there is an output from the channel 4 reader, as shown at 32a of the waveform CH4 and an output from the channel 5 reader as shown at 34a of the waveform CH5. The pulses 32a and 34a of CH4 and CH5 respectively are slightly delayed with respect to the pulse 28a from channel 1 in view of the arbitrarily selected skew on the tape. There is no output from channel 6 through 8, as shown by continuous line 36a for the waveform labeled CH6–8. There is an output from the sprocket hole reader, as shown by the pulse 38a of the waveform SH which is of a duration substantially shorter than the duration of the information data bit pulses, 28a, 32a and 34a.

As shown in FIG. 2, the pulse supplied at the output of the sprocket hole reader, or SH, after proper amplification, is inverted by passage through an inverter 40, which results in a proper phase for the signal to compensate for subsequent phase inversion caused by passage through subsequent logic elements such as gates and the like. The inverted signal is applied to the input of an OR gate 42 to a flip-flop 44, labeled TSPR flip-flop, which, when set, supplies a tape sprocket signal, TSPR, at one of its output 46, and which, when reset, provides a $\overline{TSPR}$ (not TSPR) signal at its other output 48. The TSPR flip-flop 44 is reset by an $SPR_r$ signal, provided as will be hereinafter explained. The timing of the setting and resetting of the TSPR flip-flop 44, as in the timing of operation of all the other flip-flops of FIG. 2, is controlled by a clock signal from the machine control system master clock, such signal being labeled CLK in the drawings. The signal at the output 46 of the TSPR flip-flop 44 when set is as shown at pulse 50a of TSPR waveform in FIG. 4, and that signal is fed through an OR gate 52, FIG. 1, to set an SPR (sprocket) flip-flop 54, the SPR flip-flop 54 being reset by the $SPR_r$ signal. When the SPR flip-flop 54 is set, a signal appears at its first output 53 which is applied to an input logic element 56 to enable it to provide a signal which controls the reading of the information data recorded in the channel registers for application to the machine tool controller in the usual manner. The input logic element 56 also enables parity check, the parity check scheme, is as well known, being a scheme to check errors that may have been introduced in the encoding of the information data on the tape, by providing a hole in the channel 5 of the tape each time the total number of holes of each character is an even number, such that each character always contain an odd number of holes. When both the parity check and read-in of the data is completed, the input logic element is actuated to provide an RC (read-in-complete) signal on a line 57.

Simultaneously with the reading of the sprocket hole by the sprocket hole reader, reading of the character holes is effected by the diverse channel readers and the channel signals at the output of the channel readers are, after amplification, fed in parallel to an OR gate 60 to provide a general channel signal GCH which is applied through an inverter 62 to the input of an AND gate 64 to set a first flip-flop 66 having a first output 68 which, through an AND gate 70, is adapted to set a second flip-flop 72. The second output 76 of the flip-flop 66 is applied to the input of the AND gate 64, together with appropriate time pulses on a line 78, such time pulses being of a short duration, for example a few milliseconds, and derived from the general clock of the system. The same time pulses are also, through a line 80, used to gate the AND gate 70. At the output of the AND gate 70 appears a signal representing the general sprocket reset signal labeled $SPR_r$, which is used to set the flip-flop 72 when applied in coincidence with the signal at the output 68 of the flip-flop 66. When the flip-flop 72 is set, its output is of the form illustrated at 82a in FIG. 4 thus indicating the presence of a general channel signal GCH. This signal, together with the RC signal at the output of the input logic element 56 and the signal from the second output 55 of the SPR flip-flop 54 are gated through an AND gate 84 so as to supply a CCR (clear channel register) command signal applied to the channel registers for clearing the registers for accepting the storage therein of a subsequent character.

The main purpose of the flip-flops 66 and 72 is to form a digital time delay element for the GCH signal which, after an appropriate delay, is adapted to gate the AND gate 84 to provide a CCR (clear channel register) command signal to prepare the channel registers to accept and store the next character.

An important feature of the present invention consists in deriving from the GCH signal, that is from the signal fed through the OR gate 60 and having the waveform as shown at 82a in FIG. 4, redundant LSPR (logic sprocket) signal. The inverted GCH signal, or $\overline{GCH}$, by way of a line 86 provides an appropriate signal for setting an LSPR flip-flop 88 through an OR gate 90. When set, the LSPR flip-flop 88 supplies at one output 92 an LSPR signal, having a pulse as shown at 94a in portion A of FIG. 4. The other output 96 of the LSPR flip-flop 88 provides a $\overline{LSPR}$ signal. The LSPR flip-flop 88 is reset by the $SPR_r$ signal which, as previously mentioned, is also utilized to reset the TSPR flip-flop 44 and the SPR flip-flop 54, such $SPR_r$ signal being provided at the output of the AND gate 70 and being a short duration pulse or spike as shown at 98 in FIG. 4.

The LSPR signal from the output 92 of the LSPR flip-flop 88 is fed through the OR gate 52 and is applied to set the SPR flip-flop 54. Consequently, the SPR flip-flop 54 is set either by the tape sprocket signal (TSPR) from the output 46 of the TSPR flip-flop 44 or from the logic sprocket signal (LSPR) from the output 92 of the LSPR flip-flop 88. The input logic element 56 is thus controlled by the tape sprocket signal or by the logic sprocket signal and the machine tool control system is operated in the usual manner even in the absence of a tape sprocket signal or of a logic sprocket signal.

As shown in FIG. 4, the tape sprocket signal (TSPR) 50a is timed to appear at the trailing edge of the sprocket hole signal (SH) 38a, the logic sprocket signal (LSPR) 94a and the tape sprocket signal (TSPR) 50a collapsing as soon as the TSPR flip-flop 44 and LSPR flip-flop 88 are simultaneously reset by the $SPR_r$ signal 98.

As shown in FIG. 4, in the event of a clogged sprocket hole, as illustrated in the portion C of the Figure, the character 18 of the tape 10 of FIG. 1 is read so as to give a signal 28b on channel 1, no signal in channels 2 and 3, signals 32b and 34b respectively for channels 4 and 5 and no signal for channels 6 through 8, as was the case for a normal condition.

However, no SH signal appears at the output of the sprocket hole reader as shown at 38b, such that the tape sprocket flip-flop 44 of FIG. 2 is not set. Consequently, no tape sprocket signal (TSPR) appears at the output 46 of TSPR flip-flop 44, this condition being represented by a straight line 50b in FIG. 4. However, because of the existence of a general channel signal (GCH) 82b, the GCH signal through line 86 is able to set the LSPR flip-flop 88 such that an LSPR signal appears at the output 92 thereof, as shown by pulse 94b in FIG. 4. The LSPR signal appearing at the output 92 of the LSPR flip-flop 88 is applied through the OR gate 52 to set the sprocket (SPR) flip-flop 54. The SPR flip-flop 54 being set by the logic sprocket LSPR signal supplies at its output 53 a signal into the input logic element 56. As previously explained, as long as a sprocket signal SPR is supplied at the output 53 of the SPR flip-flop 54, the control of the machine tool is operated in the usual manner, such SPR signal being used generally for the timed operation of the machine servos as a function of the instructions contained in the control or channel registers.

As shown in FIG. 4, the SPR signal at the output 53 of the SPR flip-flop 54 is of a longer duration, as shown at 100a, during normal operation conditions, because the SPR flip-flop 54 is set by the TSPR signal 50a. During the abnormal operation condition of a clogged sprocket hole or the like as shown in the portion B of FIG. 4, the SPR signal 100b is of the same duration as the LSPR signal 94b, because the SPR flip-flop 54 is set by the LSPR signal.

In the event of a total dropout, a condition which may be represented, as shown in section C of FIG. 4, by the absence of a sprocket hole SH as shown at 38c, thus resulting in the absence of a tape sprocket signal TSPR, as shown at 50c, and by failure of the logic system to provide a logic sprocket signal LSPR as shown at 94c, the SPR flip-flop 44 being never set, there is no SPR signal at the output 83 of the SPR flip-flop 53, as shown at 100c of FIG. 4. The same result will be achieved in the event of a failure of the general channel GCH, resulting in no GCH signal 82c in spite of the existence of the channel 1, 4 and 5 signals as shown at 28c, 32c and 34c, respectively.

As shown further in FIG. 2, an end of block signal (EOBT) read from channel 8 and corresponding to the end of block (EB) hole (FIG. 1) is also applied to the input of the OR gates 42 and 90 such as to provide either a TSPR or an LSPR output signal from the logic for proper timing of the stoppage of the tape translation by the tape reader at the end of a block of instructions.

As shown in FIG. 3, the TSPR signal or level at the output 46 of the TSPR flip-flop 44 and the $\overline{\text{LSPR}}$ (not LSPR) signal or level at the output 96 of the LSPR flip-flop 88 are applied to an AND gate 102 with a gating signal consisting of the $SPR_r$ (sprocket reset) signal. The $\overline{\text{TSPR}}$ signal or level from the output 48 of the TSPR flip-flop 44 and the LSPR signal or level from the output 92 of the LSPR flip-flop 88 are applied in conjunction with the same $SPR_r$ timing signal to the input of a second AND gate 104. The output from either the AND gate 102 or the AND gate 104 is applied through an OR gate 106 to set a sprocket fault flip-flop 108. Consequently, when either the tape sprocket signal or the logic sprocket signal is absent, the sprocket fault flip-flop 108 is set, and its output through a driver 110 actuates an alarm light 112, or other means, for indicating a malfunction to the operator of the machine. The sprocket fault flip-flop 108 is reset by a one clockwide pulse ST otherwise utilized for initiating data loading of the next tape block such that the alarm light 112 is continuously turned on and off.

The $\overline{\text{TSPR}}$ and LSPR signals or levels are applied in conjunction with the timing $SPR_r$ signal to the input of a third AND gate 114, the output of which is utilized to set an input fault flip-flop 116. Consequently, in the event that there is no tape sprocket signal and no logic sprocket signal, the input fault flip-flop 116 is set, so as to turn on an alarm light, or the like, 118 through a driver 120. At the same time, the setting of the input fault flip-flop 116 generates a "stop control" signal which, through a line 122, is utilized to turn off the control system of the machine. The output of the AND gate 114 is also applied through the OR gate 116 to set the sprocket fault flip-flop 108 so as to turn the alarm light, or the like, 112.

The input fault flip-flop 116 can be reset only by manual means as, for example, a pushbutton 124, such that the machine can be started only after the fault has been cleared by the machine operator.

The levels at the output of the sprocket fault flip-flop 108, utilized to actuate the driver 112 for turning on the alarm 112, is shown at 126 in FIG. 4, while the output of the input fault flip-flop 116 utilized to activate the drive 120 for the alarm 118, while providing a "stop control" signal, is shown at 128, in FIG. 4.

It can thus be seen that the present invention provides a redundant logic sprocket signal which, in the absence of a physical sprocket bit, provides appropriate command signals for a numerically controlled machine tool controller, while providing an appropriate alarm signal indicating malfunction of the system. Furthermore, in the absence of either a tape sprocket signal or a logic sprocket signal, an additional alarm is turned on and the machine control system is turned off. The redundant system of the invention is operative irrespective of a certain degree of skew in the tape, by providing appropriate delays within the logic circuitry.

Having thus described the invention by way of an example thereof, given for illustrative purpose only, what is sought to be protected by U.S. Letters Patent is as follows:

I claim:

1. In a numerical machine tool control system comprising a tape reader for reading input instructions in the form of coded information bits disposed in successive rows on a flexible tape, each row being provided with a sprocket synchronization bit and at least one information bit in one of a plurality of parallel channels, a redundant sprocket logic system comprising means generating a tape sprocket signal from each successive sprocket bit, means generating a general channel signal from each successive row as long as said row includes at least one information bit, and means generating a logic sprocket signal from the occurrence of said general channel signal for controlling the operation of said machine control system even in the absence of said sprocket bit being read from said tape by said tape reader, wherein the means generating a general channel signal is a flip-flop set by the leading edge of the first of said information bits read by said tape reader and reset after a predetermined delay.

2. The system of claim 1 further comprising means actuating a sprocket fault alarm in the absence of either said tape sprocket signal or said logic sprocket signal.

3. The system of claim 1 further comprising means actuating an input fault alarm in the absence of both said tape sprocket signal and said logic sprocket signal.

4. The system of claim 3 wherein said means actuating an input fault alarm further disables the machine tool control system.

5. The system of claim 1 wherein the means generating a tape sprocket signal is a flip-flop set by the trailing edge of the sprocket bit read by said tape reader and reset after a predetermined delay.

6. The system of claim 1 wherein the means generating a logic sprocket signal is a flip-flop set by the trailing edge of the general channel signal and reset after a predetermined delay.

7. In a numerical machine tool control system comprising a tape reader for reading input instructions in the form of coded information bits disposed in successive rows in parallel channels on a flexible tape adapted for translation relatively to said tape reader, each row of bits including a sprocket bit and at least one information bit in one of said channels, a redundant sprocket logic system comprising: means associated with the tape reader for generating a pulse signal for each sprocket bit and a separate pulse signal for each of the information bits in a row, means generating a tape sprocket signal from said first pulse signal, a flip-flop generating a logic sprocket signal from pulse signal, a flip-flop generating a logic sprocket signal by setting said flip-flop by any one of said second pulse signals by setting said flip-flop by way of the leading edge of the first of said second pulse signals to occur, said flip-flop being reset after a predetermined delay, and means operating said control system in timed relationship with the occurrence of either said tape sprocket or said logic sprocket signal.

8. The system of claim 7 further comprising means turning an alarm when either said tape sprocket signal or said logic sprocket signal is missing.

9. The system of claim 7 further disabling said control system when both said tape sprocket signal and said logic sprocket signal are missing.

10. The system of claim 7 further disabling said control system when both said tape sprocket signal and said logic sprocket signal are missing.

11. In a numerical tool control system comprising a tape reader for reading input instructions in the form of coded information bits disposed in successive rows in parallel channels on a flexible tape adapted to be translated relatively to said tape reader, each row of bits including a sprocket bit and at least one information bit in one of said channels, a redundant sprocket logic system comprising: first means associated with the tape reader for generating a first pulse signal for each sprocket bit, second means associated with the tape reader for simultaneously generating a second pulse signal for each information bit in a channel in a row, a tape sprocket flip-flop set by the trailing edge of said first pulse signal and reset after a predetermined time delayed by a reset signal, a general channel flip-flop set by the leading edge of the first of said second pulse signals to occur and reset after a predetermined time delay by said reset signal, a logic sprocket flip-flop set when said general channel flip-flop is set and reset by said reset signal, a sprocket flip-flop set when either said tape sprocket flip-flop or said logic sprocket flip-flop is set and reset by said reset signal, said sprocket flip-flop having an output controlling the timed operation of said machine tool control in a normal manner when set, and a sprocket fault flip-flop normally reset and remaining reset as long as both said tape sprocket flip-flop and logic sprocket flip-flop are set and said sprocket fault flip-flop being set by said reset signal when either said tape sprocket flip-flop or logic sprocket flip-flop is reset.

12. The system of claim 11 wherein said sprocket fault flip-flop turns an alarm on when set.

13. The system of claim 12 wherein said sprocket fault flip-flop is reset at the end of a block of input instructions.

14. The system of claim 11 further comprising an input fault flip-flop normally reset and remaining reset as long as either or both of said tape sprocket flip-flop and said logic sprocket flip-flop are set, said output fault flip-flop being set by said reset signal when both said tape sprocket flip-flop and said logic sprocket flip-flop are in a reset condition.

15. The system of claim 14 wherein said input fault flip-flop turns an alarm on when set.

16. The system of claim 15 wherein said input fault flip-flop disables said control system when set.

17. The system of claim 16 further comprising manual reset for said input fault flip-flop.